United States Patent [19]

Sherman

[11] 4,051,748

[45] Oct. 4, 1977

[54] KEY CUTTING MACHINE FOR PRODUCING OBLIQUELY ORIENTED BITTING

[75] Inventor: Charles F. Sherman, Westminster, Mass.

[73] Assignee: Unican Security Systems, Ltd, Montreal, Canada

[21] Appl. No.: 707,037

[22] Filed: July 20, 1976

[51] Int. Cl.$^2$ .................. B23C 1/16; B21K 13/00
[52] U.S. Cl. .................................. 76/110; 51/157; 90/13.05
[58] Field of Search .......... 90/13.05; 76/110; 51/157, 218 A

[56] References Cited

U.S. PATENT DOCUMENTS

| 3,457,831 | 7/1969 | Adler et al. | 90/13.05 |
| 3,807,276 | 4/1974 | Oliver | 90/13.05 |

Primary Examiner—Harrison L. Hinson
Assistant Examiner—Z. R. Bilinsky
Attorney, Agent, or Firm—Ira Milton Jones & Associates

[57] ABSTRACT

A rotary cutter type key cutting machine for duplicating keys in which the V-shaped notches that define the bitting are obliquely oriented both left and right. Identical vises mounted on a hinged carrier which swings about an axis parallel to that of the rotary cutter, grip the pattern key and the key blank and present the same respectively to a position-identifying stylus and the rotary cutter. The vises are rotatable in unison about their connections with the carrier, permitting them to be so oriented that as the carrier is swung towards the axis of the cutter, the bitted and about-to-be-bitted edges of the pattern key and the key blank are either parallel to the cutter axis or inclined with respect thereto in one direction or the other depending upon the direction the vises have been rotated. The stylus is yieldingly projected to a position at which its key-engaging tip is spaced a distance from the cutter axis greater than the radius of the cutter, so that a selected V-bit in the pattern key can be engaged with the stylus and rotary adjustment of the vises as needed to have the selected V bit fit the stylus can be effected before the key blank contacts the cutter.

12 Claims, 12 Drawing Figures

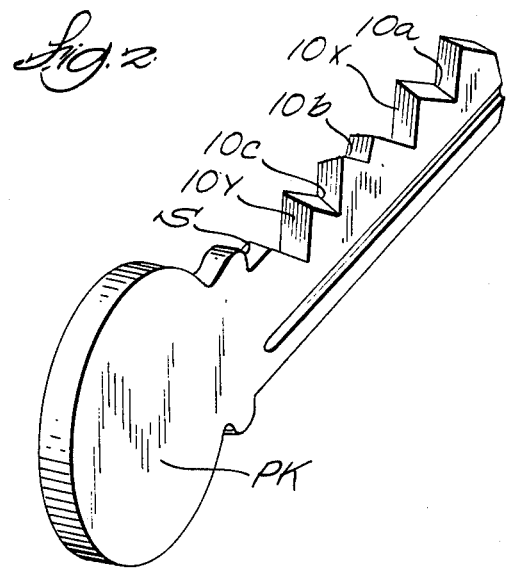
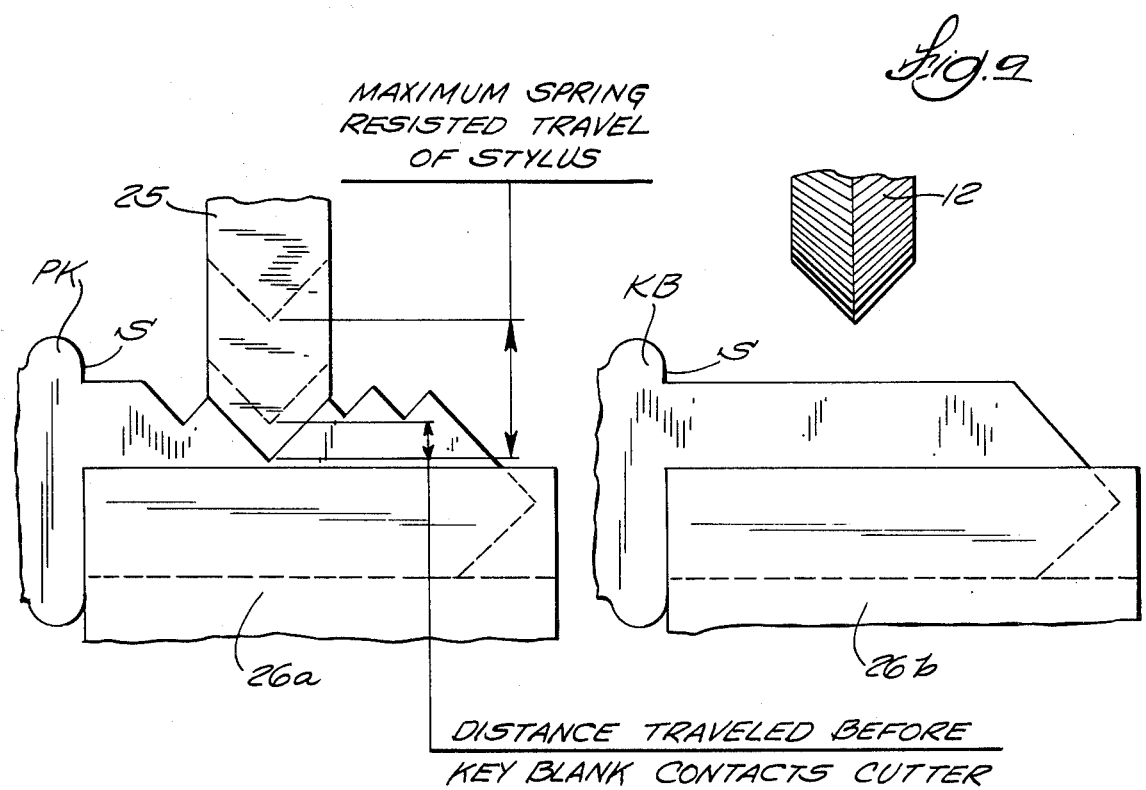

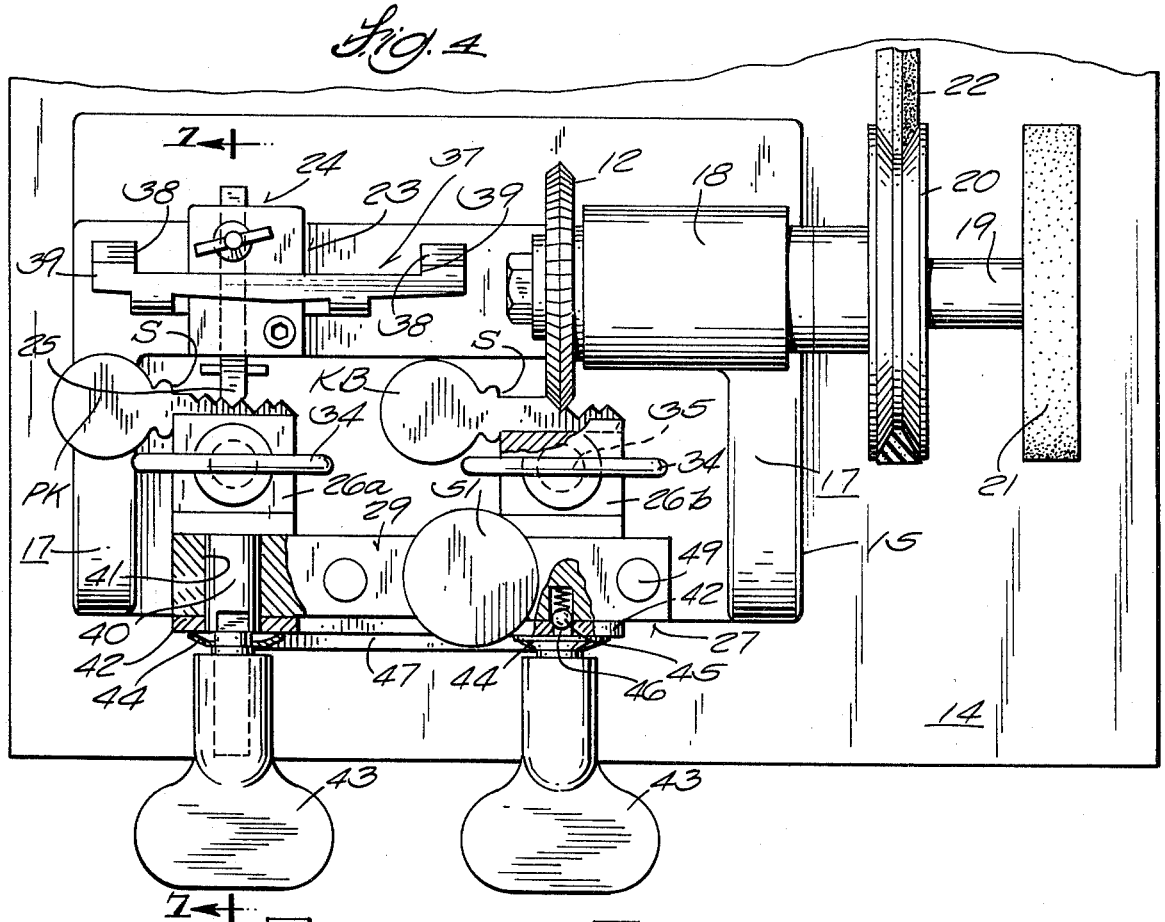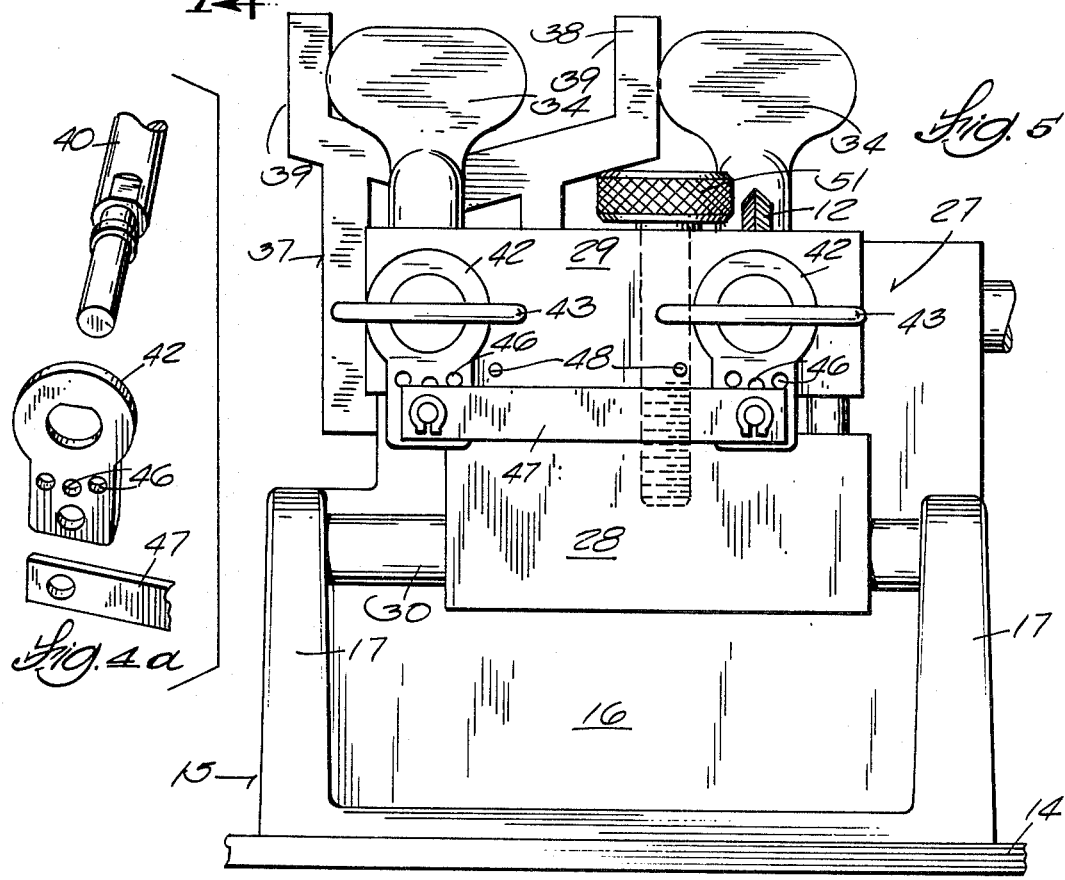

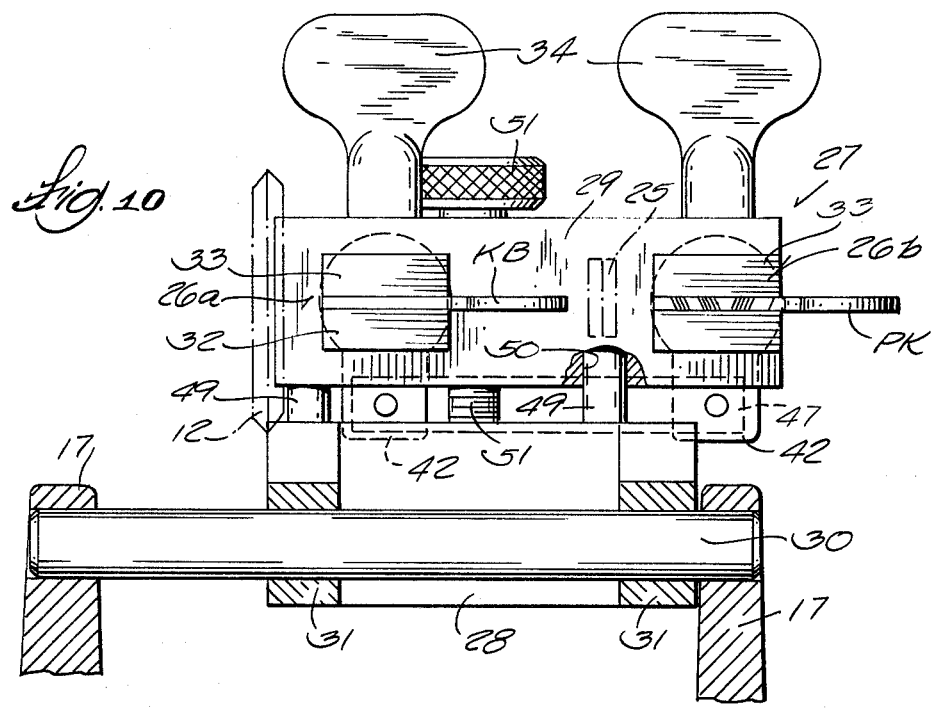
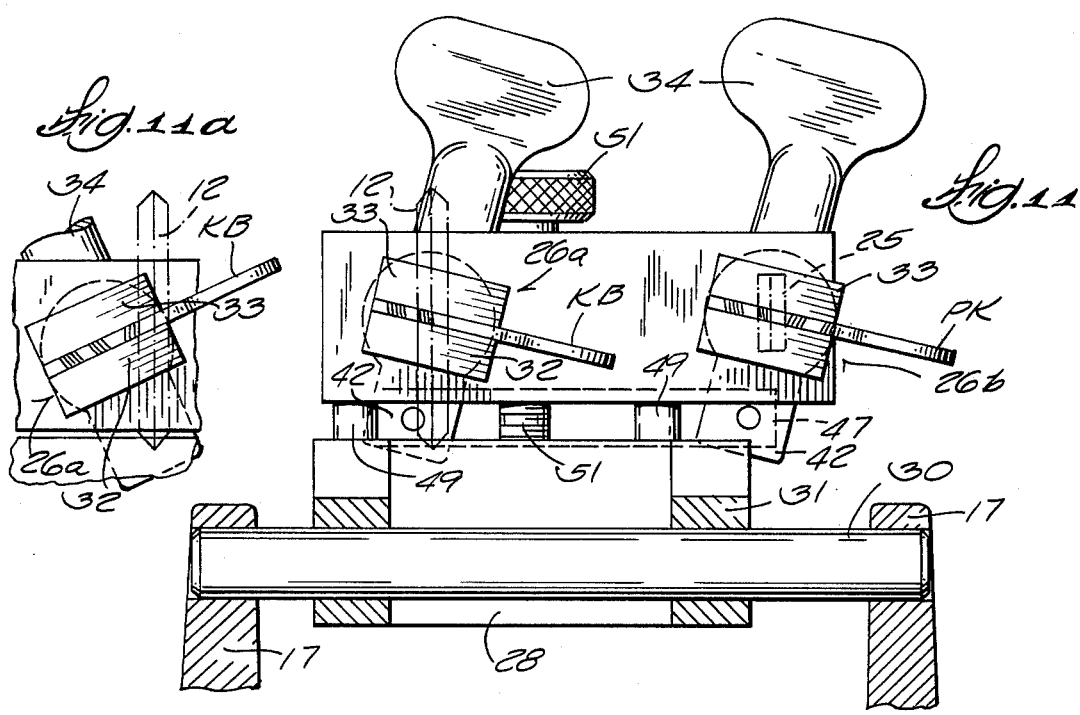

KEY CUTTING MACHINE FOR PRODUCING OBLIQUELY ORIENTED BITTING

This invention relates to key cutting machines and, more particularly, to a key cutting machine having the capability of being used to duplicate keys, in which at least some of the V-shaped notches — or V bits as they are called — that define the bitting of the key extend obliquely across the bitted edge of the key. Keys with such obliquely arranged bittings are used in cylinder locks in which the tumblers must be rotated in addition to being shifted axially in order to free the cylinder or plug of the lock for rotation. U.S. Pat. Nos. 3,499,302 and 3,499,303 illustrates examples of such locks.

Machines having the aforesaid capability have been available heretofore, as evidenced by U.S. Pat. Nos 3,457,831; 3,457,832; 3,469,498 and 3,499,366; but all such prior machines, for one reason or another, lacked the simplicity and reliability of the conventional key duplicating machines that long ago became the standard of the industry. In those conventional key cutting and duplicating machines, a key gripping assembly which includes a pair of vises by which the key to be duplicated and a key blank are gripped, is actuated to engage the key blank with a power driven rotary cutter to produce a series of V bits at locations along the key blank and to depths determined by engagement of the pattern key to be duplicated with a key tracing stylus. But such conventional key cutting machines could not be used to duplicate keys with obliquely oriented V bits.

This invention remedies that situation and does so in a way that not only retains the advantageous features of the conventional key cutting machine, but provides a significantly improved machine.

For the duplication of a conventionally bitted key, it is only necessary to successively establish the correct locations on the key blank at which the V bits are to be cut and cut the V bit to the depth identified by the pattern key. But, to duplicate a key in which the V bits are obliquely oriented, it is also necessary that the key blank and the pattern key be lengthwise tilted with respect to the axis of the rotary cutter, in one direction or the other as determined by the arrangement of the obliquely oriented V bits in the pattern key. While the Spain U.S. Pat. No. 3,499,366 teaches that the required tilting of the key blank can be effected by rotating its vise about an axis parallel to the plane of the blank, and the Adler et al., U.S. Pat. No. 3,457,832 discloses rotation of both vises in unison, in neither of these prior art disclosures is there any suggestion of how the direction and the extent of such rotation can be determined.

With a view to meeting that requirement, the present invention enables any selected V bit of the pattern key to fully engage with a novel angle-sensing stylus to identify the proper angle at which the key blank must be presented to the cutter in order to duplicate the selected pattern key V bit, and — what is most important — do so before contact between the blank and the cutter takes place.

With these observations and objectives in mind, the manner in which the invention achieves its purpose will be appreciated from the following description and the accompanying drawings, which exemplify the invention, it being understood that changes may be made in the specific apparatus disclosed herein without departing from the essentials of the invention set forth in the appended claims.

The accompanying drawings illustrate one complete example of the embodiment of the invention constructed according to the best mode so far devised for the practical application of the principles thereof, and in which:

FIG. 2 is a perspective view of a key of the type having some of its V bits obliquely or diagonally oriented, the duplication of which is greatly facilitated by this invention;

FIG. 4 is a top plan view of the machine also illustrating the same in operation and with parts thereof broken away and in section;

FIG. 4a is a perspective view illustrating a detail of the structure shown in FIG. 4;

FIG. 5 is a front view of the machine;

FIG. 9 illustrates the manner in which the stylus co-acts with the pattern key to identify the correct positional relationship between the key blank and the rotary cutter before contact therebetween;

FIG. 10 is a vertical sectional view through FIG. 6 on the plane of the line 10—10, with the key gripping assembly fully displaced from the position it occupies during the key cutting operation of the machine;

FIG. 11 is a view similar to FIG. 10, but showing the key gripping assembly engaging a pattern key with the stylus and presenting a key blank to the rotary cutter, as required to duplicate the obliquely oriented bit engaged with the stylus; and FIG. 11a is a detail view, similar to a portion of FIG. 11, to illustrate by comparison of the two Figures an essential feature of the machine.

Figure 1:
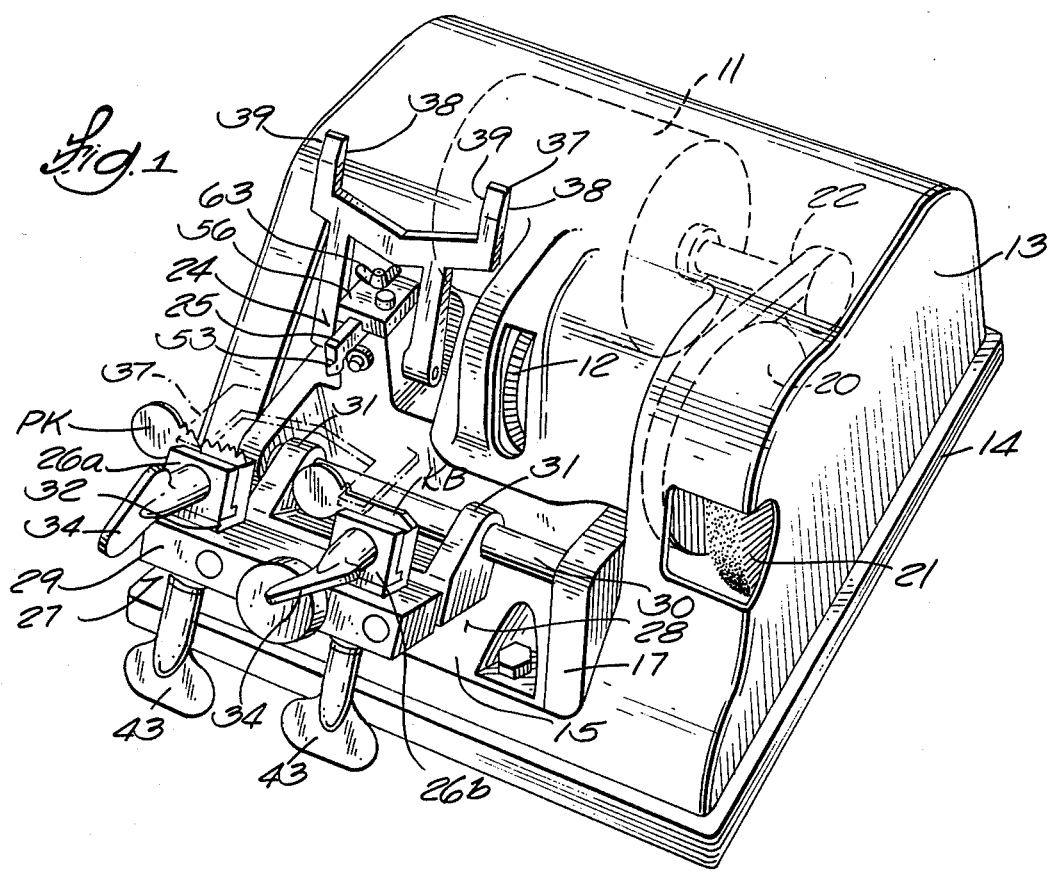
FIG. 1 is a perspective view of a key cutting machine constructed in accordance with this invention.
Figure 3:
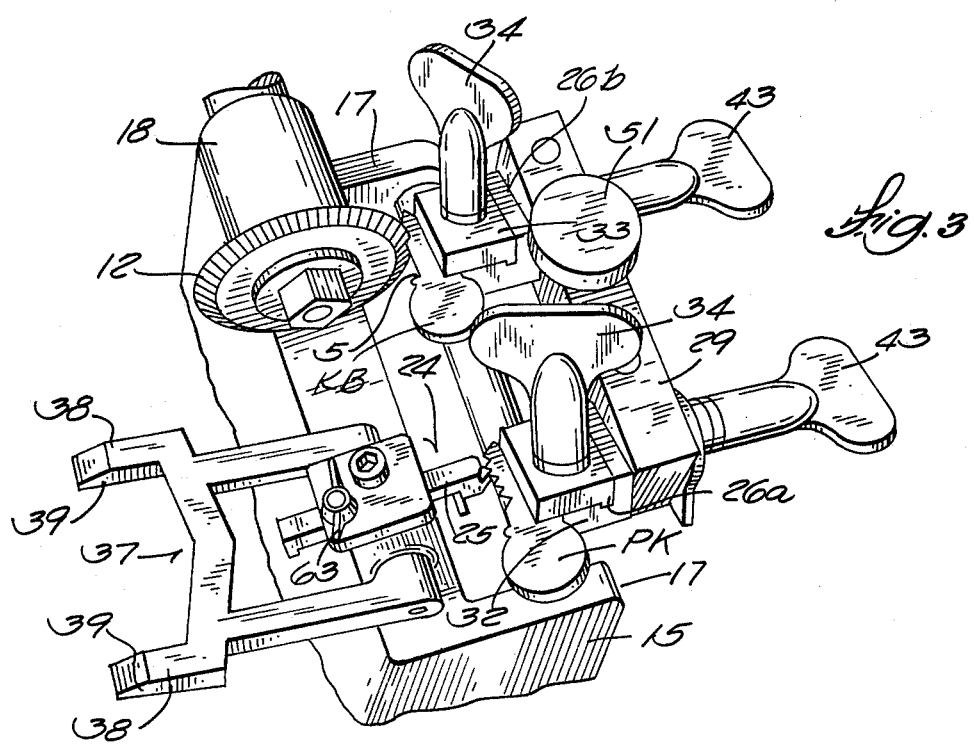
FIG. 3 is a perspective view of the essential parts of the machine viewing the same from the rear, as distinguished from the showing thereof in FIG. 1, and illustrating the machine in the act of duplicating a pattern key.

Referring now to the accompanying drawings in which like reference characters identify like parts, and considering first the key illustrated in FIG. 2, it will be seen that three of its notches or V bits — designated 10a, 10b and 10c — are obliquely oriented — that is, they extend diagonally or obliquely either to the right or the left, across the bitted edge. The other two V-bits, 10x and 10y are conventionally oriented at right angles to the longitudinal dimension of the key.

The key illustrated in FIG. 2 is thus designed for use in a cylinder lock like that of the aforesaid U.S. Pat. No. 3,499,302, wherein the key-engaging ends of the tumblers are V-shaped to have surface-to-surface engagement with the sides of the V bits in the key. By that engagement, the tumblers are brought into predetermined positions of rotation which, together with the conventional axial displacement of the tumblers resulting from the different depths to which the V bits are cut, is necessary to free the cylinder or plug of the lock for rotation.

While tools have been available with which to cut keys like the one illustrated in FIG. 2, the one of U.S. Pat. No. 3,499,366 being an example — the machine of this invention is a substantial improvement over all such prior devices.

As depicted by the drawings, the entire machine, including the electric motor 11 which drives a rotary cutter 12, is mounted on a rigid rectangularly shaped bed plate 14. A cover or hood 13 encloses all parts of the machine to which access is not needed in the cutting of keys.

Mounted on the front portion of the bed plate 13 is a base 15, which may be a casting. In any event, this member has a downwardly and forwardly sloping front wall 16 flanked by a pair of flanges 17, and projecting from its top near one of these flanges is a pedestal 18. A shaft 19 that is journaled in a bearing set into this pedestal, has the rotary cutter 12 and a pulley 20 fixed thereto, respectively at the inner and outer sides of the pedestal; and on its outermost end portion the shaft mounts a brush 21 that is accessible through an appropriately located opening in the hood, for use in removing burrs from a freshly cut key. A belt 22 drivingly connects the shaft pulley with the electric motor 11.

Spaced laterally from the pedestal 18 is a second, smaller pedestal or post 23. It mounts a stylus assembly, designated generally by the numeral 24, the actual stylus of which — identified by the numeral 25 — has a V-shaped tip to engage in and have surface-to-surface contact with the V bits of the pattern key PK to be duplicated by the cuts made in the edge of a key blank KB by engagement thereof with the rotary cutter.

The stylus assembly, as will be fully described hereinafter, is of novel design and construction and is characterized by the fact that the actual stylus 25 is yieldingly urged to a forwardly projected position to be engaged by the pattern key before the key blank comes in contact with the rotary cutter.

Figure 6:
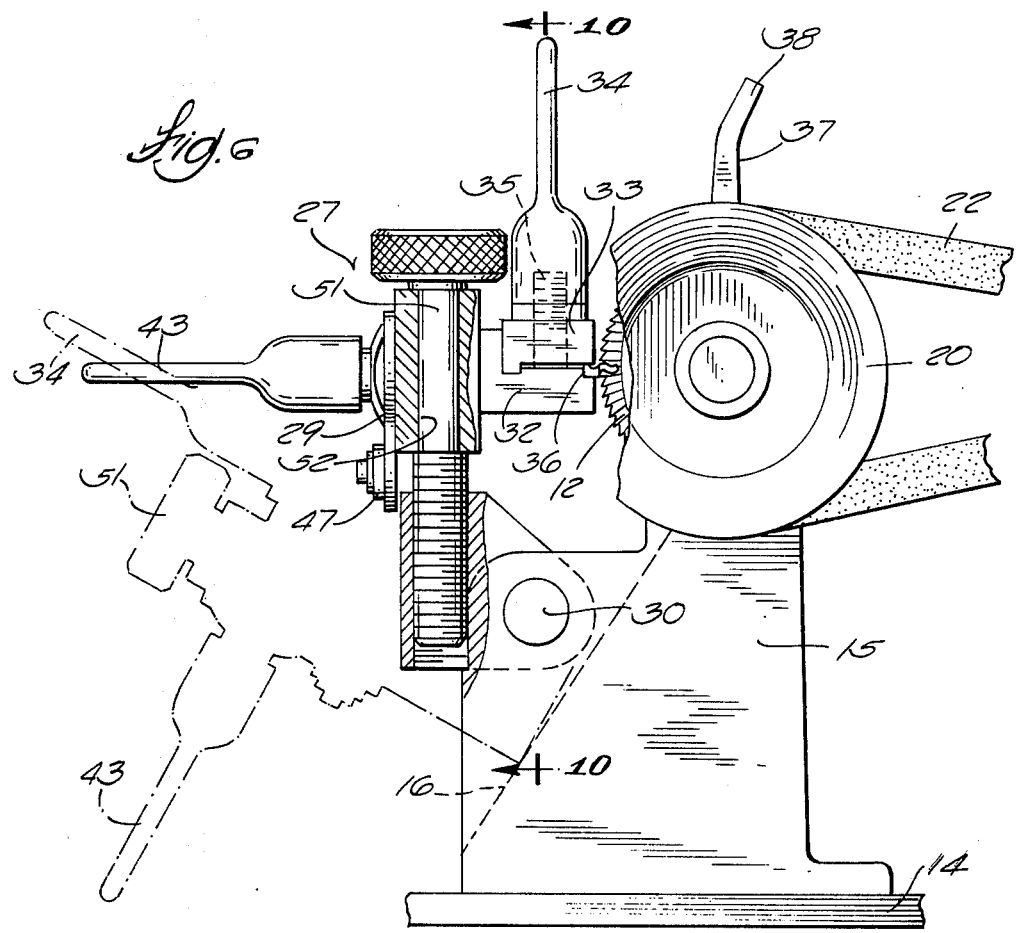
FIG. 6 is a side view of the machine with its hood removed and parts thereof broken away and in section.

As in the case of conventional key cutting machines, the key blank to be bitted, and the pattern key, are gripped by a pair of identical vises 26a and 26b that are mounted on a common carrier, identified generally by the numeral 27, and by which the vises can be swung towards and from the axis of the rotary cutter. The axis about which the common carrier swings is so located with respect to the cutter axis that the key and key blank gripped by the vises are respectively presented to the stylus and the cutter as the common carrier is swung upwardly from a lowered loading position resting against the inclined front wall 16 of the base 15, as indicated in dotted lines in FIG. 6.

The common carrier 27 comprises a hinged arm 28 and a carriage 29 adjustably connected to the arm and on which the vises are mounted. The hinged mounting for this assembly is provided by a round shaft 30 which spans the distance between the flanges 17 on the base 15 and has its end portions anchored therein. The shaft 30 freely rotatably and slidably passes through coaxial round holes in laterally spaced ears 31 that project rearwardly from the arm 28. The common carrier for the vises is thus laterally shiftable to enable any selected V bit in the pattern key to be aligned with the stylus and concomitantly bring the corresponding point on the key blank in position to be engaged with the cutter as the common carrier is swung towards the cutter axis.

As already noted, the two vises are identical. Each comprises a fixed jaw 32 and a complementary movable jaw 33, the former being L-shaped in cross section and the latter being simply rectangular in cross section and seated on the horizontal leg of its mate. A wing nut 34 threaded on a stud 35 that projects from the vertical leg of the fixed jaw and passes through a hole in the movable jaw, enables the jaws to be forced into gripping engagement with the pattern key and the key blank.

To properly locate the key and key blank in their respective vises, the upper edge of the fixed jaw is stepped to provide a ledge 36 (seen in FIG. 6) of a width less than the thickness of the keys and spaced down from the top of the jaw a distance such that with the back edge of the keys seated on this ledge, the bottom of the deepest V bit in the pattern key will be slightly above the top of the vise in which it is gripped.

It is, of course, also necessary that the pattern key and the key blank be in identically the same endwise locations with respect to the stylus and the cutter. To this end, the spacing between identical points on the two vises must be exactly the same as the distance between the edge of the stylus and the periphery of the cutter; but in addition, the pattern key and the key blank must be in exactly the same endwise location in their respective vises. To enable this latter requirement to be fulfilled, a key locating gage 37 is provided. This gage, which is hingedly mounted on the smaller pedestal or post 23, has a bifurcated outer end with spaced apart fingers 38 to overlie the vises when the latter are in the loading position shown in FIG. 1. Thus positioned, the side edge 39 of these fingers — which, too, are spaced apart exactly the same distance as the stylus and the cutter — are located to be engaged by the shoulders S at the base of the key shanks. Hence, in placing the pattern key and the key blank in their respective vises, they are set into the vises and slid forwardly until their shoulders S bear against the side edges 39 of the gage.

With the key blank and pattern key thus located, the wing nuts 34 are tightened and the gage swung out of the way.

The vise assembly is then slid along the shaft 30 to bring into alignment with the stylus the first to be duplicated of the series of V bits of the pattern key. If that V bit is one that extends obliquely or diagonally across the edge of the key, rather than squarely, it is obvious that for it to have a snug surface-to-surface fit with the stylus, the pattern key must occupy a plane that is tilted out of parallelism with the cutter axis and is normal to the plane that bisects the V bit and contains the bottom of the bit. And, of course, for the cut being made in the key blank to be a duplicate of the selected V bit, the blank must be in identically the same angular orientation. To achieve that required disposition of the pattern key and the key blank, the vises must be rotated about axes that lie between the opposite faces of the keys — preferably midway therebetween — and that perpendicularly intersect their longitudinal axes.

To enable the vises to be so rotated, each is connected with the carriage 29 by a cylindrical stud 40 that is secured to the fixed jaw of the vise and projects perpendicularly from its bottom face coaxially with the aforesaid axis about which rotation of the vise must take place. This stud 40 is journaled in a bearing hole 41 that extends through the carriage, and as best shown in FIG. 4 protrudes beyond the front face of the carriage 29 where it passes through the hub of a lever 42 and has a thumbscrew-like handle 43 fixed thereto. Where the stud passes through the hub of the lever, its cross section and that of the hole in the hub is non-circular to provide a torque transmitting connection with the lever, as best illustrated in FIG. 4a.

A spring C-washer 44 confined between the hub of the lever and an adjacent shoulder on the stud, draws the vise tightly against the rear face of the carriage and presses the hub of the lever 42 against the front face of the carriage. The resulting snug surface-to-surface relationship between the lever and the front face of the carriage permits a spring pressed ball detent 45 to coact with a series of three holes 46 arranged in an arc, through the hub of the lever, to define left-oblique, right-oblique and intermediate or square positions of the vise as its handle 43 is turned.

Inasmuch as the key blank must always be presented to the cutter in exactly the same orientation that obtains between the pattern key and the stylus, the levers 42 associated with the two vises are tied together by a link 47. It follows, therefore, that rotation imparted to either vise by its handle 43 will be duplicated by the other vise; and while the detents 45 will identify their left and right oblique positions, positive assurance against over-travel beyond these positions is provided by fixed stops 48 that protrude from the front face of the carriage in position to have the levers 42 collide therewith.

For accurate key duplication, the point on the key blank initially contacted by the periphery of the rotary cutter must always occupy the same location with respect to the axis of the cutter and the hinge axis of the common carrier. That relationship is correct for conventional bitting when the axes about which the vises are rotatably adjustable are radial to the rotor axis, since those axes of rotary vise adjustment are parallel with and lie midway between the opposite faces of the key and key blank gripped thereby. However, since the axes about which the vises are rotationally adjustable pass through the key and key blank at only one point along their length, it follows that for oblique bitting an adjustment must be made in the positional relationship between the key blank and the hinge axis of the common vise carrier, as well as between the key blank and the cutter axis, in addition to the inclination of the blank out of parallelism with the cutter axis that results from rotary adjustment of the vises. That required additional adjustment is accomplished by shifting the carriage towards or from the axis about which the common carrier swings. It is for that reason that the carriage 29 is adjustably connected with the hinged arm 28. Although that adjustable connection may take any suitable form, it is conveniently provided by a pair of parallel guide pins 49 fixed to and projecting from the hinged arm and slidably received in holes 50 in the carriage, as shown in FIG. 10. Adjustment of the carriage along these guide pins is effected by an adjusting screw 51 that is freely rotatably, but non-longitudinally movably received in a hole 52 through the carriage 29 and threaded into the adjacent portion of the arm 28, see FIG. 6.

Figure 8:
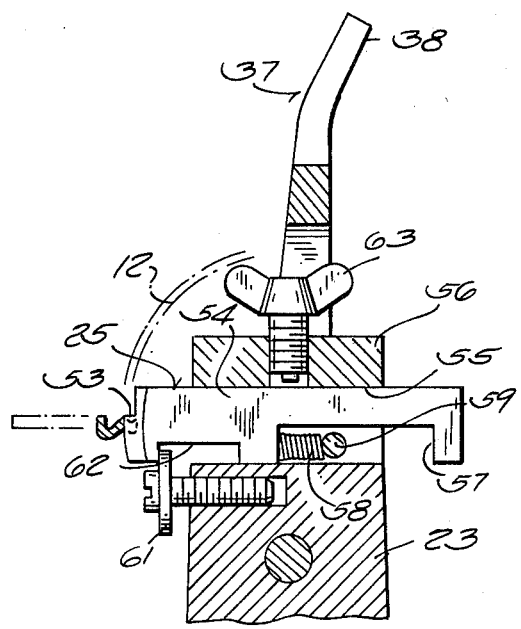
FIG. 8 is a view similar to FIG. 7 but showing the stylus depressed by the pattern key.

The need for the adjustment of the key blank (and, of course, also the pattern key) which is obtained by moving the vise carriage toward or from the axis about which the common carrier swings, is graphically depicted by comparison of FIGS. 11 and 11a. Note that in FIG. 11 the point on the key blank at which the cut is being made is closer to the tip of the key than it is in FIG. 11a. To retain the same positional relationship between those two points and the rotor and hinge axes requires the described adjustment of the carriage with respect to the hinge axis. That adjustment is correct when the top face of the pattern key at the point at which the V bit to be duplicated is located is level with a ledge 53 at the tip of the stylus 25. When that relationship is established, the axis about which the vise rotates is radial to the cutter axis, as shown in FIG. 8.

An especially significant feature of the invention is its provision for achieving positive position-indicating engagement between the V bits of the pattern key and the stylus 25 before any contact has taken place between the key blank and the rotary cutter. To enable that desirable result, the stylus is spring-pressed to a projected position, shown in FIG. 7, from which it is depressed by the pattern key as the vise assembly is moved towards the axis of the cutter. Because the projected position of the stylus is farther from the cutter axis than the periphery of the cutter, initial engagement between the pattern key and the stylus takes place well before the key blank contacts the cutter. This assures the attainment of accurate surface-to-surface engagement between the sides of the selected pattern key V bit and the stylus, and hence enables adjustment of the vise assembly, before the key blank contacts the rotary cutter.

Obviously, of course, for the stylus to have surface-to-surface contact with the pattern key V bit, its tip must have the same V-shaped formation as the V bit; and to enable that engagement to identify the correct rotary adjustment of the vises, the stylus must be constrained against rotation from a position at which the edge of its V-shaped tip lies in a vertical plane. For this purpose, the stylus is in the form of an elongated bar 54 that is rectangular in cross section and is slidably received in a correspondingly-shaped guideway 55. The guideway is formed jointly by a groove in the top of the pedestal or post 23 and a cap 56 fixed thereto.

At its underside, the bar 54 is cut out, as at 57, to accommodate a coil spring 58 that is confined between the front end of the cutout 57 and a cross pin 59 that is set into the pedestal or post and extends across the guideway. As a result, the spring yieldingly projects the bar to its foremost position defined by an adjustable stop 60. This stop is conveniently formed by the flanged head 61 of a screw threaded into the pedestal or post 23. Engagement of the inner end of another cutout 62 in the underside of the bar 54 with the flanged head 61 limits spring produced projection of the bar and thus defines the projected position of the stylus. Collision of the outer end of the cutout 62 with the flange 61 defines the depressed position of the stylus.

Attention is directed to the fact that because the outer edge of the tip of the stylus lies in a vertical plane and the included angle of its V-shaped formation is the same as that of the V bits in the pattern key, its surface-to-surface contact with the sides of the V bits in the pattern key will establish the correct angular position of the key blank with respect to the cutter axis before the blank contacts the cutter 12. For conventionally oriented V bits, that position is correct when the longitudinal axis of the key blank is parallel with the cutter axis, and for obliquely oriented V bits, the key blank must be tilted either to the right or the left.

Figure 7:
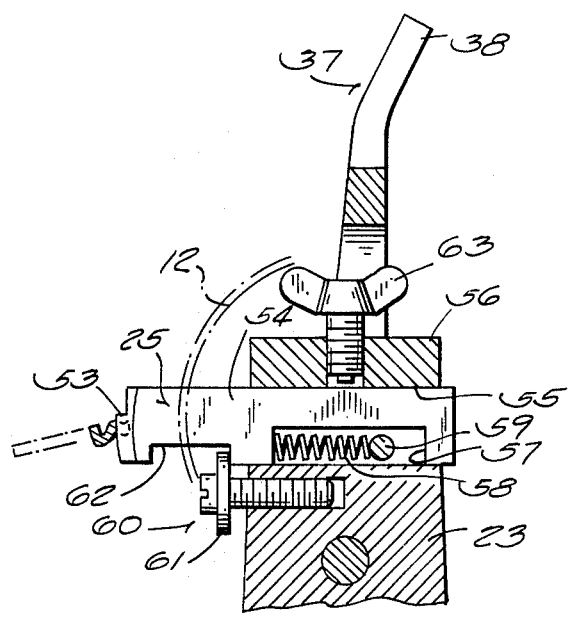
FIG. 7 is a sectional view through the stylus assembly of the machine, taken on the plane of the line 7—7 in FIG. 4, and showing the stylus in a projected position which it occupies before the pattern key is engaged therewith.

As shown in FIGS. 7 and 8, the outer edge of the tip of the stylus is curved to the same radius as the periphery of the rotary cutter. Hence, when the adjustable stop 60 has been properly set and stylus is in its depressed position, its curved outer edge, for the entire length thereof, is spaced the same distance from the cutter axis as is the periphery of the cutter.

In setting the adjustable stop 60, the vise assembly, with the pattern key gripped by its respective vise but with no blank key in place, is swung up to engage the deepest V bit of the pattern key with the stylus and, by continued upward and rearward motion of the vise assembly and in or out adjustment of the stop 60, the limit of stylus depression is set to occur when the face of the other vise — the one by which the key blank will be gripped — is spaced the same distance from the periphery of the cutter as is the face of the pattern key vise from the curved edge of the stylus tip.

Since the stop 60 limits both outward projection of the stylus as well as inward depression, the length of the cutout 62 determines the distance between the depressed and projected positions of the stylus. Accordingly, the cutout must be long enough to assure that the total travel of the stylus — between projected and depressed positions — is greater than the depth of the deepest V bit to be cut. If that dimensional relationship did not exist, the surface-to-surface position-identifying engagement between the pattern key and the stylus prior to contact of the key blank with the rotary cutter, would not be possible.

FIG. 9 graphically illustrates the aforesaid required dimensional relationship and depicts the position of the parts at the instant of initial engagement of the deepest V bit in the pattern key PK with the stylus. For clarity of illustration, the V bits in the pattern key have been shown conventionally oriented.

To convert the machine to duplication of only conventionally bitted keys, the stylus is pushed in to its fully depressed location and secured in that position by a clamping screw 63.

Since the foregoing description and the accompanying drawings fully describe the manner of using the key cutting machine of this invention, no need is seen for a separate description of its operation.

Those skilled in the art will appreciate that the invention can be embodied in forms other than as herein disclosed for purposes of illustration.

The invention is defined by the following claims:

1. A key cutting machine of the type wherein a power driven rotary cutter rotating about a fixed axis cuts V bits in a key blank at locations and to depths determined by engagement between a pattern key and a stylus, wherein the stylus and the rotary cutter occupy fixed locations along the axis of the rotary cutter, and a pair of vises having key blade clamping jaws, one to grip the pattern key and the other to grip the key blank, are mounted on common carrier means, wherein the rotary cutter and stylus, as one entity, and the common carrier means, as another entity, are relatively movable with respect to each other to enable any selected V bit in the pattern key to be brought into alignment with the stylus and also effect locating engagement between the selected V bit in the pattern key and the stylus and cutting engagement between the corresponding but unbitted edge of the key blank and the cutter, to thereby bring about the formation of a V bit in the key blank that is a duplicate in size and location of the one engaged by the stylus, said machine being characterized by its capability of enabling the operator to accurately and efficiently duplicate a pattern key in which some at least of the V bits forming the bitting of the key extend obliquely across its edge, and which to enable that result comprises:

A. means mounting the common carrier means for both hinged movement about an axis in fixed parallel relationship to the axis of the rotary cutter and reciprocating movement along its hinge axis;
B. means providing for rotation of the vises with respect to their common carrier means about parallel axes that are
  1. transverse to said hinge axis and spaced apart the distance between the stylus and the rotary cutter, and
  2. parallel to and lie between the key blade clamping jaws;
C. means constraining the vises to rotate in unison; and
D. means for manually imparting such rotation to the vises between defined limits at each of which the key blank occupies a plane angularly disposed with respect to the axis of the rotary cutter so that the V bit formed therein as said common carrier means is swung about its hinged mounting towards the axis of the rotary cutter extends obliquely across the edge of the blank, the direction of the obliqueness depending upon which of said defined limits is dictated by the stylus-sensed V bit being duplicated.

2. The key cutting machine of claim 1 further characterized by the fact that the key engaging tip of the stylus has a chisel-like V-shaped formation, the angularly disposed faces of which meet in an edge that lies in a plane perpendicular to the axis of the rotary cutter and is curved on a radius substantially equal to that of the periphery of the rotary cutter.

3. The key cutting machine of claim 2, further characterized by the fact that the periphery of the rotary cutter has a V-shaped cross section substantially identical with that of the chisel-like tip of the stylus.

4. The key cutting machine of claim 1, wherein the blade clamping jaws of the vises hold the pattern key and the key blank in longitudinal alignment, and further characterized by:

A. means mounting the stylus for movement along a defined path towards and from the pattern key vise when the latter is in position presenting a pattern key to the stylus; and
B. means yieldingly urging the stylus towards a defined outermost position in which it engages the pattern key before the key blank comes in contact with the cutter during key cutting operation of the machine.

5. The key cutting machine of claim 4, further characterized by an ajdustable stop to limit inward displacement of the stylus.

6. The key cutting machine of claim 5, further characterized by means for releasably securing the stylus against displacement from a selected position within the range of its permitted motion.

7. The key cutting machine of claim 1, further characterized in that said common carrier means for the vises comprises:

A. a hinged arm and a carriage to which the vises are rotatably connected;
B. means connecting said carriage and arm for movement in unison and for relative motion along a defined path that is substantially perpendicular to the blade clamping jaws of the vises; and
C. means for adjusting the position of the carriage relative to the hinged arm to thereby enable any selected point on a pattern key and the corresponding point on a key blank gripped by the vises to be brought to the same locations with respect to the stylus and the cutter despite angular disposition thereof with respect to the axis of the cutter.

8. The key cutting machine of claim 7, further characterized by:
   A. a stud projecting from each vise and journaled in a hole through the carriage to rotatably mount the vise on the carriage;
   B. a handle fixed to the stud of at least one of the vises by which rotation may be imparted thereto;
   C. a lever projecting radially from each stud; and
   D. a link connecting said levers to provide the means by which the vises are constrained to rotate in unison.

9. The key cutting machine of claim 8, further characterized by:
   coacting detent means on at least one of said levers and the carriage to identify different positions of rotation of the vises.

10. The key cutting machine of claim 7, further characterized by:
    A. a base to which said hinged arm is hingedly and slidably connected to thereby provide the means recited in claim 1 by which the common carrier means is mounted;
    B. a key blank locating gage having abutments thereon to engage a locating shoulder on the pattern key and on the key blank,
       said abutmens being spaced apart the same distance as the spacing between the stylus and the rotary cutter, so that engagement thereof with the locating shoulders on the pattern key and the key blank identifies correct endwise location of the key blank in its vise; and
    C. means mounting the key blank locating gage on said base for movement to and from its operative position.

11. The key cutting machine of claim 10, wherein the mounting of the hinged arm on the base comprises a shaft fixed at its ends to opposite portions of the base, and having a rotation and axial motion accommodating fit in bearing means in the hinged arm.

12. A method of duplicating a key in a machine of the type wherein a power driven rotary cutter rotating about a fixed axis cuts V bits in a key blank at locations and to depths determined by engagement between a pattern key and a stylus, wherein the stylus and the rotary cutter occupy fixed locations along the axis of the rotary cutter, and a pair of vises having key blade clamping jaws, one to grip the pattern key and the other to grip the key blank, are mounted on common carrier means, wherein the rotary cutter and stylus, as one entity, and the common carrier means, as another entity, are relatively movable with respect to each other to enable any selected V bit in the pattern key to be brought into alignment with the stylus and also effect locating engagement between the selected V bit in the pattern key and the stylus and cutting engagement between the corresponding but unbitted edge of the key blank and the cutter, to thereby bring about the formation of a V bit in the key blank that is a duplicate in size and location of the one engaged by the stylus,
    said method being characterized by its capability of enabling the operator to accurately and efficiently duplicate a pattern key in which some at least of the V bits forming the bitting of the key extend obliquely across its edge, and which to enable that result comprises:
    A. mounting the common carrier means for both hinged movement about an axis in fixed parallel relationship to the axis of the rotary cutter and reciprocating movement along its hinge axis;
    B. providing for rotation of the vises with respect to their common carrier means about parallel axes that are
       1. transverse to said hinge axis and spaced apart the distance between the stylus and the rotary cutter, and
       2. parallel to and lie between the key blade clamping jaws;
    C. constraining the vises to rotate in unison; and
    D. manually imparting such rotation to the vises between defined limits at each of which the key blank occupies a plane angularly disposed with respect to the axis of the rotary cutter so that the V bit formed therein as said common carrier means is swung about its hinged mounting towards the axis of the rotary cutter extends obliquely across the edge of the blank, the direction of the obliqueness depending upon which of said defined limits is dictated by the stylus-sensed V bit being duplicated.

* * * * *